United States Patent [19]

Miller

[11] Patent Number: 5,115,387

[45] Date of Patent: May 19, 1992

[54] CIRCUITRY AND METHOD OF PROTECTING THYRISTORS

[75] Inventor: Luther Miller, Plano, Tex.

[73] Assignee: Polyspede Electronics Corporation, Dallas, Tex.

[21] Appl. No.: 567,151

[22] Filed: Aug. 14, 1990

[51] Int. Cl.$^5$ .......................................... H02M 7/757
[52] U.S. Cl. ........................................ 363/54; 363/58; 363/87
[58] Field of Search ...................... 363/63, 54, 58, 87, 363/161, 162

[56] References Cited

U.S. PATENT DOCUMENTS

| | | | |
|---|---|---|---|
| 3,654,541 | 4/1972 | Kelly, Jr. | 363/54 |
| 4,366,427 | 12/1982 | Walker et al. | 318/798 |
| 4,394,606 | 7/1983 | Woerwag | 318/434 |
| 4,459,528 | 7/1984 | Nola | 318/729 |
| 4,475,150 | 10/1984 | D'Atre et al. | 361/51 |
| 4,527,109 | 7/1985 | Hosokawa | 318/715 |
| 4,796,142 | 1/1989 | Libert | 361/23 |

FOREIGN PATENT DOCUMENTS

0142556 11/1979 Japan ...................................... 363/96

*Primary Examiner*—R. Skudy
*Assistant Examiner*—Adolf Berhane
*Attorney, Agent, or Firm*—Baker & Botts

[57] ABSTRACT

There is disclosed a method for detecting thyristor conduction using voltage sensing means (400) rather than prior art current sensing means (112). Circuitry for protecting back-to-back thyristor bridges (300) is also disclosed having two levels of protection. One level comprises circuitry (540) for detecting firing commands to the bridges. When such commands to one bridge are detected, the circuitry is operative to prevent the transmission of firing commands to the other bridge. The other level of protection comprises circuitry (400) for detecting conduction by any thyristor in the bridges (300). When conduction by a thyristor in one bridge is detected, the bridge conduction detection circuitry is operative to prevent the transmission of firing commands to the other bridge.

27 Claims, 3 Drawing Sheets

CIRCUITRY AND METHOD OF PROTECTING THYRISTORS

TECHNICAL FIELD OF THE INVENTION

This invention relates to thyristor bridges, and more particularly to a circuit and method of preventing line-to-line faults caused by improper firing of thyristors in back-to-back bridges.

BACKGROUND OF THE INVENTION

A silicon controlled rectifier, referred to by its family name "thyristor" herein, can be thought of as a switchable diode controlled by a third terminal, the gate. If a supply voltage is applied between the anode and cathode of the thyristor, and the supply voltage is less than a critical value, the breakover voltage, and no trigger current is applied to the gate, the thyristor will remain off. When a large enough trigger current or voltage is applied to the gate, the forward breakover voltage of the thyristor will decrease to a value approximating the forward conduction drop of a diode, and the thyristor will turn on conducting as a diode. Once on, the thyristor latches on regardless of the voltage or current applied to the gate. For the thyristor to be turned off, the anode to cathode current must be reduced to near zero value by external means. In a phase-controlled thyristor, this occurs either by load current being reduced to zero by AC line voltage excursions or, in the case of continuous conduction, by the firing of another thyristor in the same bridge which contains the conducting thyristor.

Two thyristors are used for control of bipolar currents to a load. The two thyristors are connected in a back-to-back configuration with the anode of each thyristor coupled to the cathode of the other thyristor.

Circuits using back-to-back thyristor bridges include circuits for DC motor regulation, and circuits for DC bus voltage control in AC motor speed controllers, both of the type capable of power transfer from the motor back to the AC lines (regenerative controllers). The thyristor converters in such circuits typically consist of two back-to-back thyristor bridges each having a plurality of thyristor pairs connected anode-to-cathode and cathode-to-anode. A fault which effectively shorts two AC lines in such circuits can occur if certain thyristors in one bridge are turned on while any thyristor in the opposite bridge is conducting. Such a short circuit can damage or destroy the conducting thyristors.

Prior art protection circuits have been designed to detect the end of conduction of a thyristor in one bridge to prevent the firing of a thyristor in the other bridge until such firing is safe. Such prior art circuits utilize load current sensing techniques in conjunction with a time delay of typically a few milliseconds duration. The time delay is necessary, in part, because of the difficulty of determining precisely when current through a thyristor reaches zero magnitude. One disadvantage of such circuits is that they must accurately sense that a current, whose peak value may be in the 1,000 ampere range, has decreased to less than 0.1 ampere. Such resolution is difficult to obtain and is even more difficult to maintain over the life of the circuit. Furthermore, such prior art circuits are sensitive to spurious ringing currents that occur as a thyristor pair turns off. These ringing currents, which are not indicative of thyristor conduction, cause further unnecessary delay in the transfer of control between thyristor bridges; under some conditions, ringing currents may thwart transfer completely.

Consequently, a need has arisen for a protective circuit which is insensitive to ringing, does not drift over time, and precisely detects the end of thyristor conduction thereby avoiding unnecessary delay in the transfer of control from one bridge to another.

SUMMARY OF THE INVENTION

In accordance with the present invention, circuitry and method are provided to protect back-to-back thyristor bridges from power converter faults without utilizing the current sensing techniques of the prior art. Rather, the circuitry of the present invention senses the level of forward bias voltage across the thyristors as a means of providing a highly accurate, drift-free indication of thyristor conduction. If the forward bias voltage across a thyristor is of a level that might be due to thyristor conduction voltage drop, the thyristor is assumed to be conducting. The circuit then transmits a signal which inhibits the firing of any thyristor in the opposite bridge. False CONDUCTING indications due to normal excursion of the AC lines, abnormal notching of the AC lines and ringing are readily eliminated without loss of protection because of their short duration. The only delay required by the present invention is a normal delay required for thyristor recovery following thyristor conduction. Transfer of control from one bridge to the other can occur in small fractions of a half-cycle of the AC line.

Furthermore, the present invention is equally useful in single- and three-phase full wave AC to DC converters and in half-wave three-phase AC to DC converters. It may also be used with single-phase or three-phase AC to DC converters which control the DC voltage furnished to an inverter which controls an AC motor.

Consequently, the present invention has the technical advantage of providing protection for back-to-back thyristor bridges which is highly accurate, does not drift and does not introduce unnecessary delays in the transfer of control from one bridge to the other.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention is best understood by referring to FIGS. 1-5 of the drawings, like numerals being used for like and corresponding parts of the various drawings. Reference is also made to CIRCUITRY AND METHOD FOR CONTROLLING THE FIRING OF A THYRISTOR, filed concurrently herewith and incorporated by reference.

Figure 1:
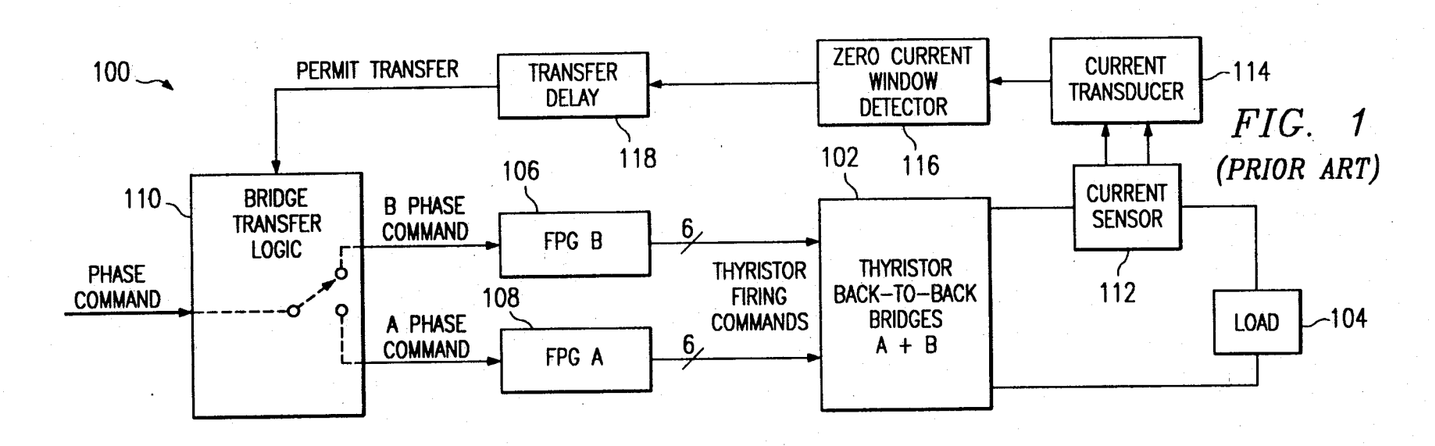
FIG. 1 illustrates a block diagram of a prior art protection circuit utilizing load current sensing.

FIG. 1 illustrates a block diagram of an example of a prior art protection system, generally indicated as 100. Two thyristor back-to-back bridges, A and B, 102 regulate the current going to a load 104, such as a motor. The gates of the thyristors in the bridges 102 are triggered by firing pulses which are initiated by firing commands from two firing pulse generators 106 and 108 which, in turn, receive phase commands from a bridge transfer logic circuit 110. A current sensor 112 is coupled between thyristor bridges 102 and load 104 and sends signals to a current transducer 114. The input of a zero current window detector 116 is coupled to the output of current transducer 114 and the output of zero current window detector 116 is coupled to the input of transfer delay circuit 118. The output of transfer delay circuit 118 is coupled to bridge transfer logic 110.

In operation, bridge transfer logic 110 selects whether the phase command is in control of bridge A firing pulse generator 108 or bridge B firing pulse generator 106. The transfer of control from one bridge to the other is dependent upon the PERMIT TRANSFER supervisory signal transmitted from transfer delay 118. If a transfer is being requested by bridge transfer logic 110, the transfer is delayed until load current transducer 114, zero current window detector 116 and transfer delay 118 determine that the load current is zero. At that time, signal PERMIT TRANSFER is transmitted to bridge transfer logic circuitry 110 and the transfer occurs.

A significant disadvantage of the prior art system illustrated in FIG. 1 is that current sensor 112 is not a perfect device. The peak current to load 104 may be in excess of 1,000 amperes but before transfer of control from one bridge to the other can occur, the current must decrease to less than 0.1 amperes. Otherwise, a line-to-line fault can occur wherein bridge thyristors 102 may be damaged. Current transducer 114, which processes the output from current sensor 112, must accurately maintain its zero point within the 10,000:1 resolution range required. In practice, zero current window detector 116 determines only that the output of current transducer 114 is close to zero. The detection band in zero current window detector 116 is made sufficiently wide to account for drift and other inaccuracies in current sensor 112 and current transducer 114. Because of these tolerances, the output of zero current window detector 116 indicates only that load current has reached a low value, not that it has reached a zero value. Consequently, transfer delay circuitry 118 is included to reduce the detection uncertainty based upon the assumption that current to load 104 will continue to decrease after coming within the range of zero current window detector 116 and will actually reach zero after a certain time has expired. The safe delay time is dependent, in part, on the circuit tolerances as well as upon the inductance of load 104. An adjustment to transfer delay circuitry 118 is often provided to achieve an installation-related compromise delay time that yields acceptably smooth transfer of control between bridges without blowing fuses due to bridge faults. Nonetheless, the delay time may have to be adjusted periodically as the circuit ages. The zero point of current transducer 114 may also have to be adjusted periodically due to offset drift in current sensor 112.

A further disadvantage of prior art circuit 100 is that ringing currents generated when a thyristor turns off may pass repetitively through zero magnitude and be detected by current sensor 112. Zero current window detector 116 may treat such ringing currents as actual load current and repetitively trigger delay cycles of transfer delay 118. As a result, transfer is delayed excessively and, when transfer of control is finally achieved, it may be unacceptably rough.

Figure 2:
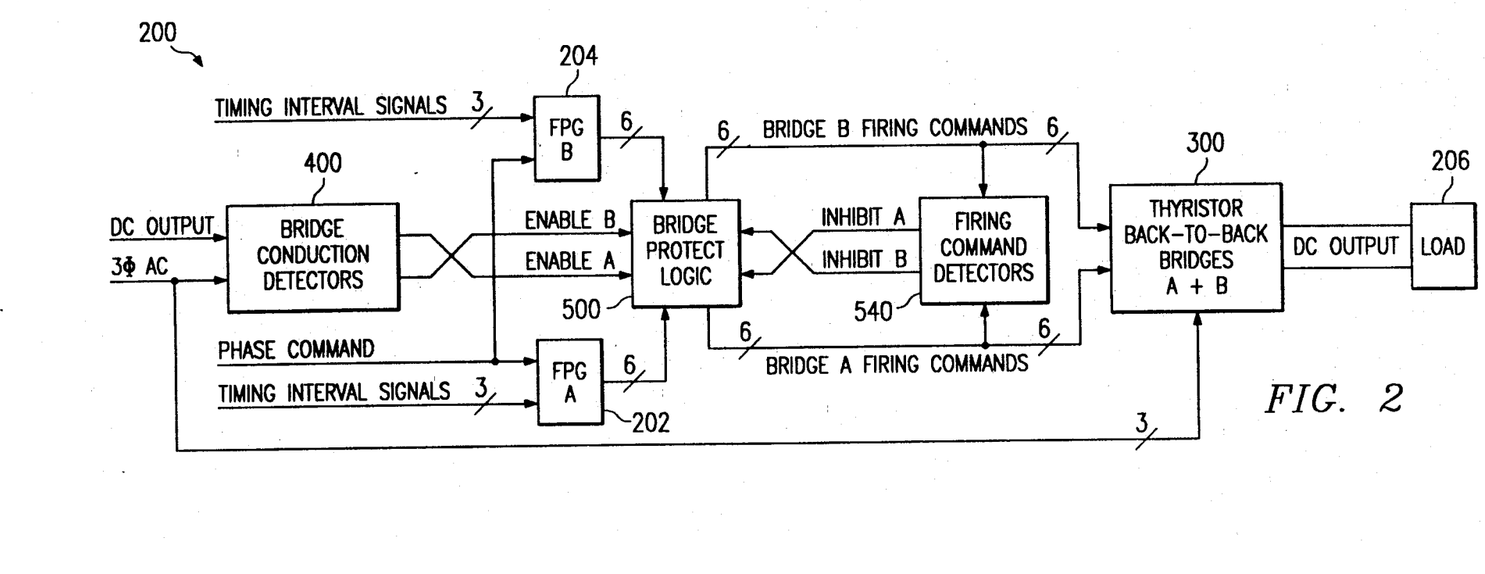
FIG. 2 illustrates a block diagram of the protection system of the present invention utilizing thyristor voltage sensing.

FIG. 2 illustrates a block diagram of the present invention, indicated generally as 200, in a three-phase configuration. An enable circuit comprised of bridge conduction detectors 400 is coupled to the DC output and to three-phase AC power lines. Bridge conduction detectors 400 output signals ENABLE A and ENABLE B to a first set of inputs of bridge protect logic circuit 500. Firing pulse generators A and B 202 and 204 each transmit six firing commands to bridge protect logic circuit 500. Timing interval signals and phase command signals are input into firing pulse generators 202 and 204. The output of bridge protect logic circuit 500 is coupled to firing means within 300 which fires thyristors in back-to-back bridges A and B 300. A load 206 is coupled to the output of bridges 300. An inhibit circuit comprised of firing command detectors 540 is coupled to the outputs of bridge protect logic circuit 500; the outputs of firing command detectors 540 are coupled to a second set of inputs of bridge protect logic circuit 500. Thyristor bridges 300 are also coupled to the three-phase AC lines.

In operation, thyristor back-to-back bridges A and B 300 convert the AC power to DC and control the current flowing to load 206. Firing command detectors 540 detect the firing command signals from bridge protect logic 500. If firing command detectors 540 detect firing commands going to the thyristors in bridge A, signal INHIBIT B will be at a true logic state and be transmitted from firing command detectors 540 to bridge protect logic 500 to prevent firing commands from being transmitted to bridge B thyristors. Subsequent to thyristor firing, bridge conduction detectors 400 determine which set of thyristors, A or B, is conducting. If thyristors in bridge A are conducting, the output from a group of bridge conduction detectors in 400 is at a false logic state (NOT ENABLE B) to prevent the thyristors in bridge B from firing. Consequently, there are two levels of protection, both of which prevent thyristors in one bridge from firing when there are any thyristors being fired or already conducting in the other bridge. The first level of protection is provided by firing command detectors 540. The second level of protection is provided by bridge conduction detectors 400 and is necessary because thyristors continue to conduct even after firing signals have been removed from their gates; such conduction is not detected by firing pulse detectors 540.

Figure 3:
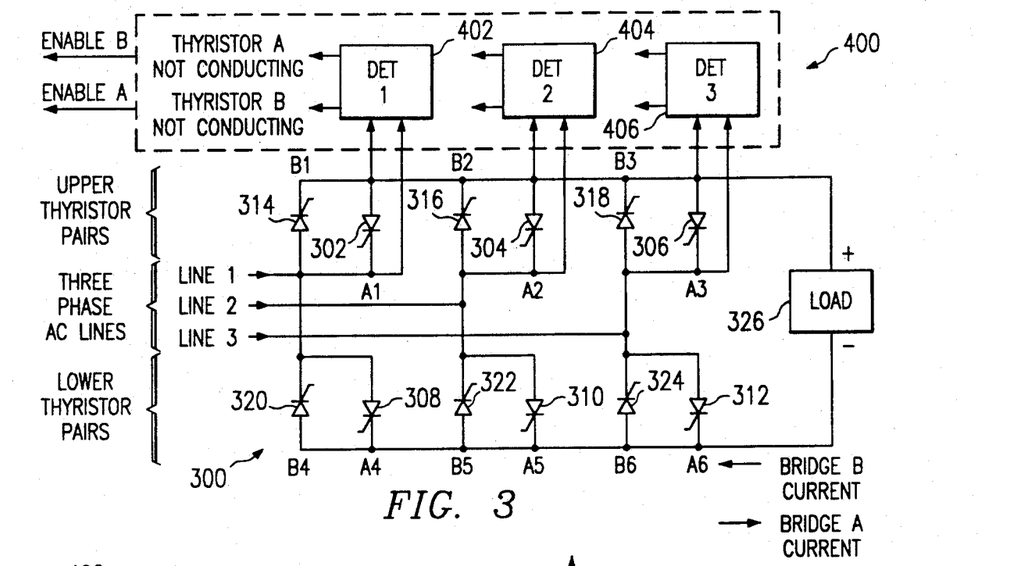
FIG. 3 illustrates a schematic diagram of thyristors in a three-phase back-to-back configuration showing the connections to the bridge conduction detectors of the present invention.

FIG. 3 illustrates two 6-thyristor back-to-back bridges, generally indicated as 300, with associated conduction detectors 400 also referred to herein as an ENABLE circuit. A first thyristor bridge A, comprising thyristors A1 302, A2 304, A3 306, A4 308, A5 310, and A6 312, and a second bridge B, comprising thyristors B1 314, B2 316, B3 318, B4 320, B5 322 and B6 324, are coupled between three-phase AC lines and a load 326. The anodes of thyristors 308 and 314 and the cathodes of thyristors 302 and 320 are connected to AC line 1.

The anodes of thyristors 310 and 316 and the cathodes of thyristors 304 and 322 are coupled to AC line 2. The anodes of thyristors 312 and 318 and the cathodes of thyristors 306 and 324 are coupled to AC line 3. The cathodes of thyristors 314, 316 and 318 and the anodes of thyristors 302, 304 and 306 are coupled to the positive terminal of load 326 (for purposes of this disclosure, polarities have been assigned to the terminals of load 326). The anodes of thyristors 320, 322 and 324 and the cathodes of thyristors 308, 310 and 312 are coupled to the negative terminal of load 326. The gate of each thyristor is coupled to circuitry for causing a current pulse to flow into the thyristor gate with the circuitry responsive to the firing commands shown in FIG. 2.

One input of a first thyristor conduction detector 402 is coupled to the positive terminal of load 326 and the other input is coupled to AC line 1. One input of a second thyristor conduction detector 404 is coupled to the positive terminal of load 326 and the other input is coupled to AC line 2. One input of a third thyristor conduction detector 406 is coupled to the positive terminal of load 326 and the other input is coupled to AC line 3. The outputs of thyristor conduction detectors 402, 404 and 406 are processed and the resulting signals ENABLE A and ENABLE B are transmitted to bridge protect logic 500.

FIG. 3 may be used to illustrate an improper thyristor firing sequence. If thyristors B1 314 and B5 322 are conducting, and thyristor A2 304 is erroneously fired, a line-to-line short circuit between AC lines 1 and 2 will occur resulting in potentially destructive line currents. The purpose of conduction detectors and associated circuitry 400 is to detect whether any thyristor in a bridge is conducting. If so, the protection circuitry prevents the firing of any thyristor in the opposite bridge. Consequently, the outputs of the three conduction detectors 402, 404 and 406 must be logically combined in such a manner that they reflect the conduction status of the two separate bridges as two output signals BRIDGE A NOT-CONDUCTING and BRIDGE B NOT-CONDUCTING rather than reflecting the conduction status of six thyristors in the two bridges as six separate outputs. Such a logical combination is illustrated in FIG. 4 which assumes comparators with open-collector transistors as outputs performing a wired AND logic operation.

In one aspect of the invention, an additional set of three conduction detectors (not shown) can be coupled to the lower three thyristor pairs shown in FIG. 3. However, such an addition is not necessary for adequate operation of the present invention. This is because various upper and lower thyristors must always be fired in pairs for successful conduction through the thyristors and load 326 to occur. For example, for one of the upper thyristors to be conducting current which starts at an AC line connection point and then passes through load 326, a lower thyristor must also be conducting to provide a return path to another AC line. Thus, conduction detectors monitoring only the upper three thyristor pairs as illustrated in FIG. 3, when incorporated in the total protective system of FIG. 2, provide adequate determination as to whether or not bridge thyristor conduction is occurring.

Figure 4:
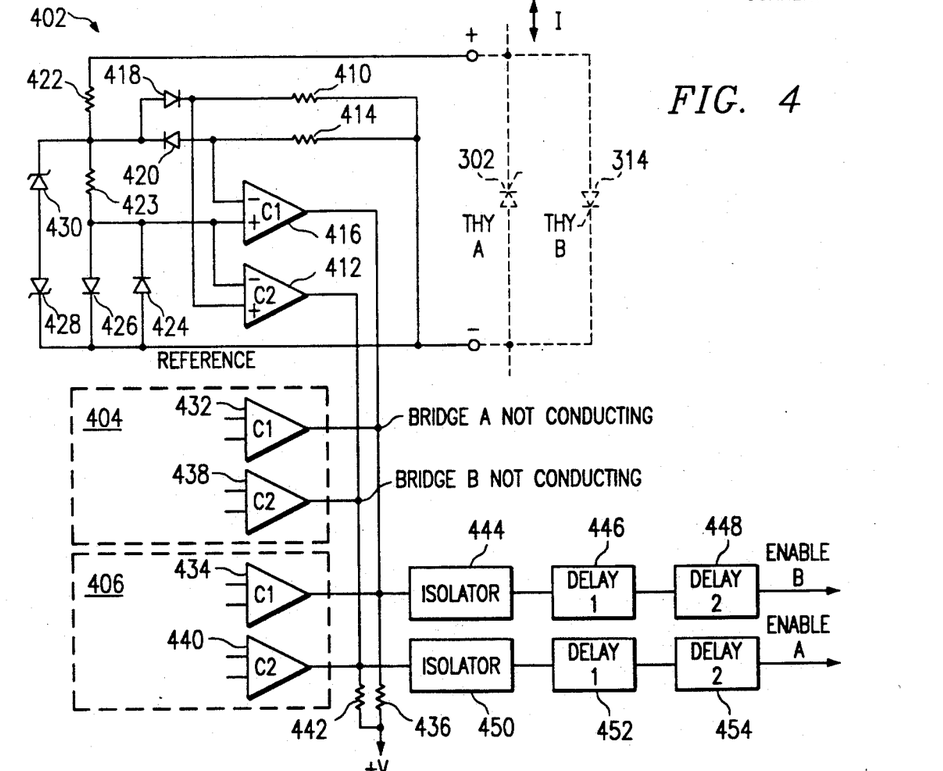
FIG. 4 illustrates a schematic diagram of the bridge conduction detectors and related circuitry of the present invention.

FIG. 4 illustrates a schematic diagram of the preferred embodiment of thyristor conduction detector 402 of FIG. 3 along with the output logic and associated output circuitry. A thyristor pair comprising thyristor 302 of bridge A and thyristor 314 of bridge B is coupled to the inputs of conduction detector 402. The gates of thyristors 302 and 314 are fired by means not shown in the FIGURES, said means being responsive to firing commands shown in FIG. 2. For purposes of clarity, polarities have been assigned to the input terminals of conduction detector 402; these polarities are not related to the load polarity assigned in FIG. 3. A reference line corresponding to the upper output line shown in FIG. 3, is coupled to the negative input terminal of conduction detector 402. One end of a resistor 410 is coupled to the reference line and the other end is coupled to the non-inverting input of a comparator 412. One end of another resistor 414 is also coupled to the reference line and the other end of resistor 414 is coupled to the inverting input of another comparator 416. The cathode of a diode 418 is coupled to the non-inverting input of comparator 412 and the anode of a diode 420 is coupled to the inverting input of comparator 416. The anode of diode 418 and the cathode of diode 420 are coupled together and also coupled to one end of a resistor 422, the other end of which is coupled to the positive input terminal of conduction detector 402. A resistor 423 is coupled between the anode of diode 418 and the non-inverting input of comparator 416. The inverting input of comparator 412 is also coupled to the non-inverting input of comparator 416. The anode of a diode 424 and the cathode of a diode 426 are coupled to the reference line and the cathode of diode 424 and the anode of diode 426 are coupled to the non-inverting input of comparator 416 and the inverting input of comparator 412. The cathode of a Zener diode 428 is coupled to the reference line and the anode of Zener diode 428 is coupled to the anode of a Zener diode 430. The cathode of Zener diode 430 is coupled to the anode of diode 418.

The circuitry for conduction detectors 404 and 406 is the same as that for conduction detector 402; consequently, only the comparators of conduction detectors 404 and 406 are shown to illustrate the generation of NOT-CONDUCTING signals. Comparators 416, 412, 432, 438, 434 and 440 are of the type which use an open-collector transistor as the comparator output to facilitate wired AND logic by paralleling of a plurality of comparator outputs. The output of comparator 416 of conduction detector 402, the output of a comparator 432 of conduction detector 404 and the output of a comparator 434 of conduction detector 406 are coupled together and to one end of a pull-up resistor 436 comprising a first wired AND logic function. The output of comparator 412 of conduction detector 402, the output of a comparator 438 of conduction detector 404 and the output of a comparator 440 of conduction detector 406 are coupled together and to one end of a second pull-up resistor 442 comprising a second wired AND logic function. The other ends of pull-up resistors 436 and 442 are coupled to a voltage source.

The combined outputs of comparators 416, 432 and 434 of the three conduction detectors 402, 404 and 406 are coupled to the input of an isolator 444, the output of which is coupled to the input of a first delay circuit 446. The output of first delay 446 is coupled to the input of a second delay circuit 448 and the output of second delay 448 is the enable circuit's second ENABLE output from which signal ENABLE B is transmitted. The combined output of comparators 412, 438 and 440 of the three conduction detectors 402, 404 and 406 is coupled to the input of an isolator 450, the output of which is coupled to the input of a first delay circuit 452. The output of first delay 452 is coupled to the input of second delay circuit 454 and the output of second delay 454 is the enable circuit's first ENABLE output from which signal ENABLE A is transmitted. First delay circuits 446 and 452 comprise trailing-edge delays of the ENABLE B and ENABLE A signals respectively, and are operative to delay transition of signals to a NOT-ENABLE level. Second delay circuits 448 and 454 comprise leading-edge delays of the ENABLE B and ENABLE A signals, respectively, and are operative to delay transition of the signals to an ENABLE level.

Conduction detector 402 determines whether a thyristor 302 or 314 is forward- or reverse-biased and, if forward-biased, whether the forward-biased condition is due to thyristor conduction or to thyristor blocking in the forward-biased direction. Such a decision is based upon the magnitude of the forward-biased voltage across a thyristor. If this voltage is of a magnitude that might be due to thyristor conduction, circuit 402 assumes that conduction by thyristor 302 or 314 is occurring. If the forward-biased voltage is of too high a magnitude to be due to thyristor conduction, such as 8-10 volts, circuit 402 assumes that the thyristor is not conducting.

To determine the conduction of thyristor 314, comparator 412 senses the null point of a bridge comprising resistors 410 and 423 and diodes 418 and 426. For the voltage polarity shown, thyristor 314 is either conducting a current I or is blocking applied voltage of the polarities assigned in FIG. 4 to the inputs of conduction detector 402.

Resistors 410, 414 and 423 are of equal value and have values 0.1 to 0.2 times the value of resistor 422. If thyristor 314 is conducting a current I, the voltage drop across thyristor 314 (typically one to two volts) is applied to the bridge through resistor 422. Diodes 418 and 426 will be conducting with a typical conduction voltage of 0.5 volts appearing across the diodes. If the value of resistor 422 is 9.5 times the value of resistor 410, the voltage drop across resistor 410 will typically be between 0.025 volts and 0.075 volts. Thus, the voltage at the inverting input of comparator 412 will be +0.5 volts and the voltage at the non-inverting input of comparator 412 will be +0.025 to +0.075 volts. Because the inverting input of comparator 412 is more positive than the non-inverting input of comparator 412, the output of comparator 412 will be at a low logic state. Thus, the required low output occurs when thyristor 314 is conducting.

If thyristor 314 is forward-biased but not conducting (if it is blocking forward-bias voltage), the voltage across thyristor 314 will begin at zero volts and will increase in magnitude as a function of time to a value much greater than ten volts. Thus, the initial output of comparator 412 will be low as if thyristor 314 is conducting. However, as the voltage across thyristor 314 continues to increase, the voltage across diodes 418 and 426 remains relatively constant while the voltage across resistor 410 continues to increase. When the positive polarity voltage across resistor 410 exceeds that of the voltage across diode 426 (approximately 0.5 volts), the magnitude of the positive voltage at the non-inverting input of comparator 412 exceeds that of the positive voltage at the inverting input of comparator 412 and the output of comparator 412 makes a transition from a low to a high logic state, correctly indicating that thyristor 314 is not conducting. This transition occurs when the voltage across thyristor 314 reaches approximately 10 volts for the resistance ratio assumed. Note that, during the time in which the voltage across resistor 410 was increasing to the detection threshold, a false CONDUCTING output (low logic state) was produced by comparator 412. Nonetheless, this is a safe response for a protective circuit of this type in that it produces a low signal at the output of comparator 412 indicating that thyristor 314 is conducting until circuit 402 determines with certainty that the thyristor is not conducting.

If thyristor 314 is reverse-biased and not conducting, diode 418 will be reverse-biased and the voltage at the non-inverting input of comparator 412 with respect to the reference line will be zero volts. Diode 424 will be forward-biased and the voltage at the inverting input of comparator 412 will be approximately −0.5 volts. Consequently, the output of comparator 412 will be at a high logic state giving a correct NOT-CONDUCTING signal.

In a similar manner when polarity across the thyristors is opposite that shown in FIG. 4, comparator 416 indicates the conduction of thyristor 302 in thyristor bridge A. Comparator 416 compares the voltages at different points in a bridge comprised of resistors 423 and 414 and diodes 420 and 424 and generates the appropriate CONDUCTING and NOT-CONDUCTING outputs.

Zener diodes 428 and 430 of conduction detector 402 prevent the voltage at the inputs of comparators 412 and 416 from rising to levels beyond the ratings of the comparators.

The first wired AND connection comprising pull-up resistor 436 and the outputs of comparators 416, 432, and 434 monitors the A thyristor bridge; the second wired AND connection comprising pull-up resistor 442 and the outputs of comparators 412, 438 and 440 monitors the B thyristor bridge; each produces a single output signal which is at low logic level when any thyristor in the monitored bridge is conducting.

Isolator circuits 444 and 450 are used in the preferred embodiment of the present invention because conduction detectors 402, 404 and 406 are directly connected to the AC lines. The remainder of the circuitry illustrated in FIG. 2, however, is generally referenced to earth ground. Consequently, isolation is necessary between the output of the conduction detectors and the balance of the circuit. Such isolation circuitry may be in the form of an LED optically coupled to a photosensitive transistor.

The first delay circuits 446 and 452 provide slightly smoother response when high response analog circuitry is used to provide the phase command signal to the firing pulse generators. So called "notches" in the AC line voltages are common on three-phase AC lines which feed thyristor motor controls. These notches will cause false CONDUCTING indications in the outputs of the conduction detectors. The notches are of short duration, typically in the 20 microsecond range. The purpose of the first delay circuits 446 and 452 is to filter out these false conduction indications thereby avoiding unnecessary dead spots in phase-command response of the conducting bridge. The first delay circuits provide a trailing-edge delay of the related ENABLE signal thereby preventing unnecessary removal of the ENABLE signal to the conducting bridge in response to false conduction indications of shorter time duration than the trailing-edge delay. First delay circuits 446 and 452 also cause a delay in recognition of valid conduction events. The signal stretch blocks of FIG. 5 provide the necessary protection during trailing-edge time delays imposed by first delay circuits 446 and 452.

The second delay circuits 448 and 454 provide essential leading edge delay of the respective ENABLE signals which guarantee that thyristors in a previously conducting bridge will have regained their forward blocking ability before thyristor firing in the previously non-conducting bridge is permitted. A time delay of 0.15 milliseconds is commonly recommended by manufacturers of phase control grade thyristors. In operation, as current conduction in a thyristor bridge reaches zero, the output of the conduction detector changes from a low logic state to a high logic state. The ENABLE input signal which protects a previously non-conducting thyristor bridge remains at a low logic state (NOT ENABLE) until the delay created by a second delay circuit 448 or 454 expires at which time the associated ENABLE signal changes to a high logic state thereby permitting transmission of firing pulses to the previously non-conducting bridge.

Figure 5:
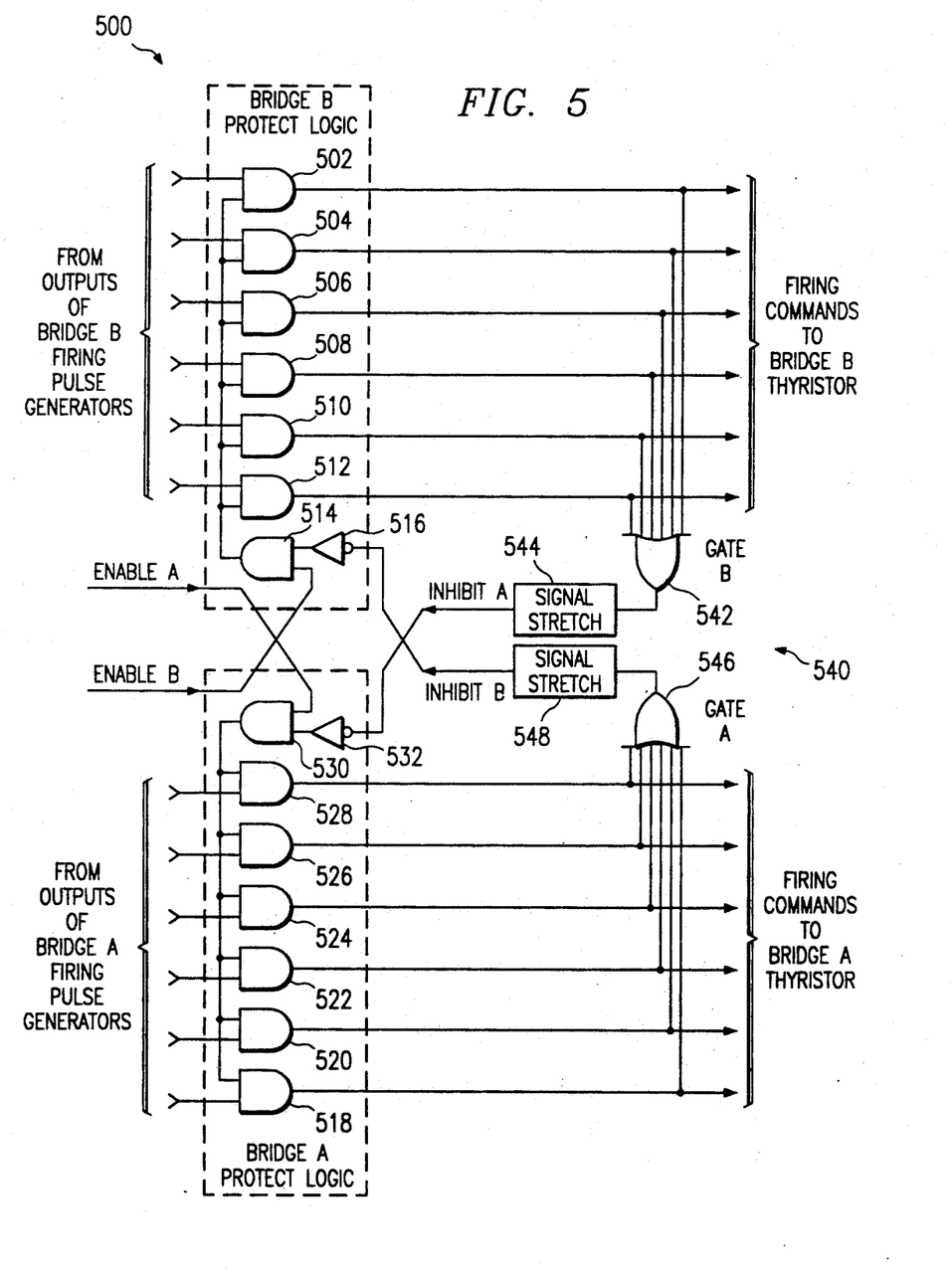
FIG. 5 illustrates a diagram of the bridge protect logic and firing pulse detector circuits of the present invention.

FIG. 5 illustrates one embodiment of the bridge protect logic circuit 500 and firing command detectors 540. Bridge B protect logic circuit comprises six AND gates 502, 504, 506, 508, 510 and 512, each having an input coupled to the output of bridge B firing pulse generators 204. The other input of each AND gate 502, 504, 506, 508, 510 and 512 is coupled to the output of AND gate 514. One input of AND gate 514 is coupled to one output of bridge conduction detectors 400 to receive signal ENABLE B. The other input of AND gate 514 is coupled to the output of an inverter 516.

Similarly, the protect logic for bridge A comprises six AND gates 518, 520, 522, 524, 526 and 528, each having an input coupled to the output of bridge A firing pulse generators 202. The other input of each AND gate 518, 520, 522, 524, 526 and 528 is coupled to the output of an AND gate 530. One input of AND gate 530 is coupled to the other output of bridge conduction detectors 400 to receive signal ENABLE A. The other input of AND gate 530 is coupled to the output of an inverter 532.

The firing command detector for bridge B comprises a six-input OR gate 542. Each of the six inputs to OR gate 542 is coupled to the output of one of the AND gates 502, 504, 506, 508, 510 and 512 of the bridge B protect logic. The output of OR gate 542 is coupled to the input of signal stretch circuitry 544, the output of which is coupled to the input of inverter 532.

Similarly, the firing command detector for bridge A comprises a six-input OR gate 546. Each input of OR gate 546 is coupled to an output of one of the AND gates 518, 520, 522, 524, 526 and 528. The output of OR gate 546 is coupled to the input of signal stretch circuitry 548 and the output of signal stretch circuitry 548 is coupled to the input of inverter 516.

The purpose of firing command detectors 542 and 546, along with bridge protect logic 500, is to prevent simultaneous firing of a bridge A thyristor and a bridge B thyristor. OR gate 542 monitors the six firing command lines going to bridge B thyristors from the six outputs of the bridge B protect logic. If a firing command is present on one or more of these firing command lines, the output of OR gate 542 is at a high logic state and is passed through signal stretch circuitry 544 to become signal INHIBIT A. Signal INHIBIT A acts through the bridge A protect logic circuitry to prevent the transmission of any firing command signals to bridge A thyristors until signal INHIBIT A is at a low logic level. When high, signal INHIBIT A is inverted by inverter 532 preventing the output of AND gate 530 from achieving a high logic level. This, in turn, prevents any of AND gates 518, 520, 522, 524, 526 or 528 in bridge A protect logic from obtaining a high logic state which would permit transmission of a firing command to a bridge A thyristor.

In a similar manner, OR gate 546 detects the status of the firing command lines from bridge A protect logic to prevent, when necessary, the transmission of any firing command through the bridge B protect logic to bridge B thyristors.

Signal stretch circuits 544 and 548 provide a trailing edge delay on the INHIBIT signals going to inverters 516 and 532. The purpose of the delay is to ensure that firing pulses to a thyristor are inhibited until a preset time after all firing pulses in the other thyristor bridge have been removed. As a result, thyristors in a previously conducting bridge will have ceased conduction and will have recovered forward blocking ability before firing in the opposite bridge is permitted.

Signal stretch circuits 544 and 548 also provide bridge fault protection for the case in which the thyristors are conducting very small, very short current pulses. During this condition, the firing command which initiated thyristor conduction may have been reduced to zero before the output from the conduction detector for the conducting thyristor bridge has propagated through the first delay circuitry 446 or 452 of FIG. 4. The trailing edge delay provided by the signal stretch circuitry 544 or 548 whose input is coupled to the firing command lines of the conducting bridge provides the necessary INHIBIT signal to the bridge protect logic of the non-conducting bridge during this critical time interval.

In summary, the phase command signal shown in FIG. 2 is the only functional command input to thyristor bridges 300. Other command inputs are protective or are for establishing synchronization of firing pulses to the AC lines. If the timing interval signals are generated by the method described in co-pending patent application, Ser. No. 07/567273, entitled CIRCUITRY AND METHOD FOR CONTROLLING THE FIRING OF A THYRISTOR, then the polarity of the phase command signal selects which bridge is to conduct. The magnitude of the phase command signal determines (non-linearly) the magnitude of load current delivered by that bridge. The protective circuitry of the present invention is essentially transparent and does not interfere with the normal functioning of the phase command voltage. The protective circuitry may momentarily override the phase command only when the phase command is at zero magnitude or is passing through zero dynamically. If protective control is exercised at the zero crossing of a dynamic swing of the phase control voltage, the first current pulse delivered by the newly-selected bridge may be delayed by the protective circuitry to avoid overlap with the trailing edge of the last current pulse delivered by the previously conducting bridge. This time delay reduces the amplitude of this first current pulse below the value dictated by the phase command voltage. Normally, only the first current pulse delivered by a newly-selected bridge is affected and extremely smooth transfer between bridges is accomplished without the loss of several current pulses as might occur in prior art circuits.

The protective circuitry of the present invention will also exercise supervisory control over the phase command voltage if the firing pulse generators are set for "overlap." For this setting, bridge A and bridge B firing pulse generators 202 and 204 will command simultaneous firing of bridge A and bridge B thyristors at a small conduction angle in response to a zero phase command voltage. For this case, the firing command detectors of FIG. 2 randomly select one bridge or the other for conduction and subsequently randomly pass control from one bridge to the other. This results in small load currents of alternating polarity and of zero average value known as "dither," "crossfire," or "overlap" currents which tend to break static friction in motor loads.

Thus, the present invention provides protective circuitry which is transparent to the phase command voltage function except when control is being transferred between bridges and during that interval protective override is unobtrusive and not disruptive to the primary phase command function.

Although the present invention has been described in detail, it should be understood that various changes, substitutions and alterations can be made herein without departing from the spirit and scope of the invention as defined by the appended claims.

For example, the protection circuits of the present invention can be used in single-phase configurations and half-wave configurations as well as in the three-phase, full-wave configuration disclosed herein.

As a further example, the conduction detectors which determine thyristor conduction by voltage sensing means can be implemented by a plurality of different circuits.

Furthermore, the conduction sensors and the principle of voltage sensing, rather than current sensing to determine thyristor conduction, can be applied to prior art circuits without inclusion of the firing pulse detectors.

And finally, the combinational logic and delay functions described in FIG. 5 as well as the delay functions shown in FIG. 6 can readily be incorporated in the program of a microcontroller or a microprocessor which performs a plurality of tasks within the thyristor control system. It should therefore be understood that such incorporation is within the spirit and scope of the invention and the appended claims.

What is claimed is:

1. A circuit for detecting conduction in at least two thyristors arranged in a back-to-back relationship, the circuit comprising:
   means for monitoring the voltage drop across both said thyristors;
   means for providing a CONDUCTING signal in response to said monitored voltage drop reaching at least a predetermined level indicative of forward conduction;
   means for providing a NOT-CONDUCTING signal in response to said monitored forward voltage drop being is greater than said predetermined level or said monitored voltage drop is indicative of reverse bias;
   a processor for controlling the firing of said thyristors in accordance with said CONDUCTING and NOT-CONDUCTING signals; and
   an enable circuit responsive to conduction in said thyristors for preventing the firing of either of said thyristors while one of said thyristors is forward biased to said predetermined conduction level, said enable circuit having first and second ENABLE outputs.

2. The circuit set forth in claim 1 further comprising:
   a plurality of said thyristors arranged in a back-to-back relationship to form a multi-thyristor bridge across said AC line; and
   means, including said CONDUCTING and NON-CONDUCTING signals, for preventing said thyristors in one of said bridges from firing while a thyristor in the other of said bridges is conducting.

3. The thyristor control circuit of claim 2 and further comprising:
   means for monitoring the firing commands transmitted to said thyristors to determine which of said thyristors is receiving a firing pulse; and
   means, controlled by said firing command monitoring means, for preventing the transmission of firing commands to said bridges.

4. The thyristor control circuit of claim 3 wherein said preventing means further includes means for preventing said thyristors in one of said bridges from firing while any of said thyristors in the other of said bridges is receiving a firing pulse.

5. The thyristor control circuit set forth in claim 3 further comprising a processor responsive to said monitoring means for controlling the transmission of said firing commands.

6. The thyristor control circuit of claim 1 wherein said enable circuit includes a plurality of conduction detectors each having:
   a first input terminal coupled to a first terminal of a thyristor pair;
   a second input terminal coupled to a second terminal of said thyristor pair;
   a first output terminal coupled to said first NOT-CONDUCTING output; and
   a second output terminal coupled to said second NOT-CONDUCTING output, whereby said first NOT-CONDUCTING output is at a low logic state and said second NOT-CONDUCTING output is at a high logic state when a thyristor in said first thyristor bridge is forward-biased to conduction level and said second NOT-CONDUCTING output is at a low logic state and said first NOT-CONDUCTING output is at a high logic state when a thyristor in said second thyristor bridge is forward-biased to conduction level.

7. The thyristor control circuit of claim 6 wherein each said conduction detector further includes:
   a first comparator having an inverting input, a non-inverting input, and an output coupled to said first NOT-CONDUCTING output;
   a first diode having an anode coupled to said second input terminal and a cathode coupled to said non-inverting input of said first comparator;
   a second diode having an anode coupled to said inverting input of said first comparator;
   a third diode having an anode coupled to said non-inverting input of said first comparator and a cathode coupled to said second input terminal;
   a first resistor coupled between said second input terminal and the cathode of a fourth diode;
   a second resistor coupled between said second input terminal and said inverting input of said first comparator;
   a third resistor coupled between the cathode of said second diode and said non-inverting input of said first comparator; and
   a fourth resistor coupled between the cathode of said second diode and said first input terminal whereby said output of said first comparator is at a low logic state if a first thyristor, the cathode of which is coupled to said first input terminal and the anode of which is coupled to said second input terminal, is forward biased to conduction level.

8. The thyristor control circuit of claim 7 wherein each said conduction detector further includes:
a second comparator having a non-inverting input, an inverting input coupled to said non-inverting input of said first comparator, and an output coupled to said second NOT-CONDUCTING output; and
a fourth diode having an anode coupled to the cathode of said second diode and a cathode coupled to said non-inverting input of said second comparator wherein said output of said second comparator is at a low logic state if a second thyristor, the anode of which is coupled to said first input terminal and the cathode of which is coupled to said second input terminal, is forward biased to conduction level;
a fifth resistor having one terminal coupled to said first NOT-CONDUCTING output and a second terminal coupled to a voltage source; and
a sixth resistor having one terminal coupled to said second NOT-CONDUCTING output and a second terminal coupled to said voltage source.

9. The thyristor control circuit of claim 6 wherein said enable circuit further includes:
a first isolator circuit having an input coupled to said first NOT-CONDUCTING output of said conduction detectors;
a first delay circuit, operative to delay the trailing edge of a second ENABLE output, and having an input coupled to the output of said first isolator circuit;
a second delay circuit, operative to delay the leading edge of said second ENABLE output, and having an input coupled to the output of said first delay circuit and an output coupled to said second ENABLE output;
a second isolator circuit having an input coupled to said second NOT-CONDUCTING output of said conduction detectors;
a third delay circuit, operative to delay the trailing edge of a first ENABLE output, and having an input coupled to the output of said second isolator circuit;
a fourth delay circuit, operative to delay the leading edge of said first ENABLE output, and having an input coupled to the output of said third delay circuit and an output coupled to said first ENABLE output.

10. The thyristor control circuit of claim 1 wherein said enable circuit comprises:
a plurality of first AND gates, each having;
a first input coupled to the output of one of a plurality of first firing pulse generators;
a second input;
an output for transmitting firing commands to a thyristor in said first bridge;
a second AND gate having:
a first input coupled to said first ENABLE output of said enable circuit;
a second input;
an output coupled to said second inputs of said first AND gates;
a plurality of third AND gates, each having:
a first input coupled to the output of one of a plurality of second firing pulse generators;
a second input;
an output for transmitting firing commands to a thyristor in said second bridge;
a fourth AND gate having:
a first input coupled to said second ENABLE output of said enable circuit;
a second input; and
an output coupled to said second inputs of said third AND gates.

11. A method for protecting thyristors against line-to-line faults by controlling the firing of thyristors, said method comprising the steps of:
detecting whether a firing command is being transmitted to any thyristor in one of said bridges;
transmitting a signal indicative of said firing command to a processor; and
preventing, by action of said processor, any firing commands from being transmitted to the thyristors in the other of said bridges; and
disabling the transmission of firing commands to any thyristor in the first bridge while any thyristor in the second bridge is forward biased to conduction level and disabling the transmission of firing commands to any thyristor in the second bridge while any thyristor in the first bridge is forward biased to conduction level.

12. The method of claim 11 wherein said detecting step for each of said bridges includes the steps of:
monitoring the firing command lines of the said bridge;
outputting a TRUE logic signal if any said firing command line is transmitting a firing command; and
outputting a FALSE logic signal if any said firing command line is not transmitting a firing command.

13. The method of claim 11 wherein said disabling step includes the steps of:
detecting whether any thyristor in one of said bridges is forward biased to conduction level;
transmitting a signal, indicative of said conduction, to a processor; and
preventing, by action of said processor, any firing commands from being transmitted to the thyristors in the other of said bridges.

14. The method set forth in claim 13 wherein said detecting step of said disabling step is performed on a plurality of thyristors in each of said thyristor bridges, and wherein each said detecting step further includes the steps of:
ascertaining polarity of the voltage across a thyristor; and
measuring the magnitude of the voltage across said thyristor if polarity of said voltage represents forward bias of the thyristor; and
determining from the magnitude of said measurement if said thyristor is conducting or is blocking forward-bias voltage, or determining from said ascertaining step that said thyristor is not conducting due to reverse bias of the thyristor; and
producing a signal indicative of the conduction status of said thyristor.

15. A protection circuit for protecting a system controlling the flow of current to a load against line-to-line faults, comprising:
a first thyristor bridge having a plurality of thyristors;
a second thyristor bridge having a plurality of thyristors, said first and second thyristor bridges being in a back-to-back configuration of thyristor pairs, the output of said bridges being coupled to the load;

a plurality of first firing pulse generators to generate firing commands to the thyristors in said first thyristor bridge;

a plurality of second firing pulse generators to generate firing commands to the thyristors in said second thyristor bridge;

an inhibit circuit responsive to said first and second firing commands, said inhibit circuit for preventing the transmission of firing commands to any said thyristor in said first bridge while any said thyristor in said second bridge is receiving firing commands from said second firing pulse generator and for preventing the transmission of firing commands to any said thyristor in said second bridge while any said thyristor in said first bridge is receiving a firing command from said first firing pulse generator;

an enable circuit responsive to the voltage across said thyristors, said enable circuit for preventing the transmission of firing commands to any said thyristor in said first bridge while any said thyristor in said second bridge is conducting current to the load and for preventing the transmission of firing commands to any said thyristor in said second bridge while any said thyristor in said first bridge is conducting current to the load, said enable circuit having first and second ENABLE outputs;

a bridge protect logic circuit responsive to said inhibit circuit and said enable circuit, said bridge protect logic circuit for transmitting firing command signals from said first and second firing pulse generators to said thyristors; and said enable circuit including a plurality of conduction detectors each having:

a first input terminal coupled to a first terminal of a thyristor pair;

a second input terminal coupled to a second terminal of said thyristor pair;

a first output terminal coupled to a first NOT-CONDUCTING output; and a second output terminal coupled to a second NOT-CONDUCTING output, whereby said first NOT-CONDUCTING output is at a low logic state and said second NOT-CONDUCTING output is at a high logic state when a thyristor in said first thyristor bridge is forward biased to conduction level and said NOT-CONDUCTING output is at a low logic state and said first NOT-CONDUCTING output is at a high logic state when a thyristor in said second thyristor bridge is forward biased to conduction level.

16. The protection circuit of claim 15 wherein each of said conduction detectors includes:

a first comparator having an inverting input, a non-inverting input and an output coupled to said first NOT-CONDUCTING output;

a first diode having an anode coupled to said second input terminal and a cathode coupled to non-inverting input of said first comparator;

a second diode having an anode coupled to said inverting input of said first comparator;

a third diode having an anode coupled to said non-inverting input of said first comparator and a cathode coupled to said second input terminal;

a first resistor coupled between said second input terminal and the cathode of a fourth diode;

a second resistor coupled between said second input terminal and said inverting input of said first comparator;

a third resistor coupled between the cathode of said second diode and said non-inverting input of said first comparator;

a fourth resistor coupled between the cathode of said second diode and said first input terminal, whereby said output of said first comparator is at a low logic state if a first thyristor, the cathode of which is coupled to said first input terminal and the anode of which is coupled to said second input terminal, is forward biased to conduction level;

a second comparator having a non-inverting input, an inverting input coupled to said non-inverting input of said first comparator, and an output coupled to said second NOT-CONDUCTING output;

a fourth diode having an anode coupled to the cathode of said second diode and a cathode coupled to said non-inverting input of said second comparator whereby said output of said second comparator is at a low logic state if a second thyristor, the anode of which is coupled to said first input terminal and the cathode of which is coupled to, said second input terminal, is forward biased to conduction level;

a fifth resistor having one terminal coupled to said first NOT-CONDUCTING output and a second terminal coupled to a voltage source; and a sixth resistor having one terminal coupled to said second NOT-CONDUCTING output and a second terminal coupled to said voltage source.

17. The protection circuit of claim 15 wherein said enable circuit further includes:

a first isolator circuit having an input coupled to said first NOT-CONDUCTING output of said conduction detectors;

a first delay circuit, operative to delay the trailing edge of a second ENABLE output, and having an input coupled to the output of said first isolator circuit;

a second delay circuit, operative to delay the leading edge of said second ENABLE output, and having an input coupled to the output of said first delay circuit and an output coupled to said second ENABLE output;

a second isolator circuit having an input coupled to said second NOT-CONDUCTING output of said conduction detectors;

a third delay circuit, operative to delay the trailing edge of a first ENABLE output, and having an input coupled to the output of said second isolator circuit;

a fourth delay circuit, operative to delay the leading edge of said first ENABLE output, and having an input coupled to the output of said third delay circuit and an output coupled to said first ENABLE output.

18. The protection circuit of claim 15 wherein said inhibit circuit includes:

a first OR gate having a plurality of inputs, each input coupled to a firing command line for a thyristor in said first bridge, and an output coupled to the input of a first pulse stretch circuit; the output of the first pulse stretch circuit comprises the second INHIBIT output; said first OR gate is operable to detect if a firing command is being transmitted to any thyristor in said first bridge; and a second OR gate having a plurality of inputs, each input coupled to a firing command line for a thyristor in said second bridge, and an output coupled to the input of a second pulse stretch circuit; the output of the second pulse stretch circuit comprises the first INHIBIT output; said second OR gate is operable to detect if a firing command is being transmitted to any thyristor in said second bridge.

19. The protection circuit of claim 18 wherein said signal stretch circuits are operative to delay the trailing edge of the signals generated by said OR gates.

20. The protection circuit of claim 15 wherein said bridge protect logic circuit includes:
a plurality of first AND gates, each having:
a first input coupled to the output of one of said first firing pulse generators;
a second input;
an output for transmitting firing commands to a thyristor in said first bridge;
a first inverter having an input coupled to the output of said first signal stretch circuit;
a second AND gate having:
a first input coupled to said first ENABLE output of said enable circuit;
a second input coupled to the output of said first inverter;
an output coupled to said second input of said first AND gates;
a plurality of third AND gates, each having:
a first input coupled to the output of one of said second firing pulse generators;
a second input;
an output for transmitting firing commands to a thyristor in said second bridge;
a second inverter having an input coupled to the output of said second signal stretch circuit;
a fourth AND gate having:
a first input coupled to said second ENABLE output of said enable circuit;
a second input coupled to the output of said second inverter; and
an output coupled to said second inputs of said third AND gates.

21. A conduction detector circuit for use in a system to detect conduction in either of two thyristors connected as a pair in a back-to-back configuration, such that one thyristor controls current flow from an AC line to a load terminal, and the other thyristor controls opposite current flow from said load terminal to said AC line, the conduction detector comprising:
a first input terminal coupled to a first terminal of said thyristor pair;
a second input terminal coupled to a second terminal of said thyristor pair;
a first output terminal coupled to said first NOT-CONDUCTING output; and
a second output terminal coupled to said second NOT-CONDUCTING output, whereby said first NOT-CONDUCTING output is at a low logic state and said second NOT-CONDUCTING output is at a high logic state when a first thyristor of said thyristor pair is forward biased to conduction level and said second NOT-CONDUCTING output is at a low logic state and said first NOT-CONDUCTING output is at a high logic state when a second thyristor of said thyristor pair is forward biased to conduction level.

22. The conduction detector circuit of claim 21 wherein each of said conduction detectors further includes:
a first comparator having an inverting input, a non-inverting input and an output coupled to said first NOT-CONDUCTING output;
a first diode having an anode coupled to said second input terminal and a cathode coupled to said non-inverting input of said first comparator;
a second diode having an anode coupled to said inverting input of said first comparator;
a third diode having an anode coupled to said non-inverting input of said first comparator and a cathode coupled to said second input terminal;
a first resistor coupled between said second input terminal and the cathode of a fourth diode;
a second resistor coupled between said second input terminal and said inverting input of said first comparator;
a third resistor coupled between the cathode of said second diode and said non-inverting input of said first comparator;
a fourth resistor coupled between the cathode of said second diode and said first input terminal, whereby said output of said first comparator is at a low logic state if a first thyristor, the cathode of which is coupled to said first input terminal and the anode of which is coupled to said second input terminal, is forward biased to conduction level;
a second comparator having a non-inverting input, an inverting input coupled to said non-inverting input of said first comparator, and an output coupled to said second NOT-CONDUCTING output;
a fourth diode having an anode coupled to the cathode of said second diode and a cathode coupled to said non-inverting input of said second comparator whereby said output of said second comparator is at a low logic state if said second thyristor, the anode of which is coupled to said first input terminal and the cathode of which is coupled to said second input terminal, is forward biased to conduction level;
a fifth resistor having one terminal coupled to said first NOT-CONDUCTING output and a second terminal coupled to a voltage source; and
a sixth resistor having one terminal coupled to said second NOT-CONDUCTING output and a second terminal coupled to said voltage source.

23. A method of protecting inverse-parallel connected thyristors having first and second back-to-back bridges in an N-phase AC to DC converter against improper firing sequences capable of producing a short circuit between AC line inputs of the converter, the method comprising the steps of:
producing a first signal preceding thyristor conduction in said first thyristor bridge;
producing a second signal confirming conduction in said first thyristor bridge;
logically combining said first and second signals and producing a third signal representative of the conduction interval of thyristors in said first thyristor bridge; and
inhibiting the firing of any thyristor in said second thyristor bridge in response to said produced third signal.

24. The method of claim 23 wherein said first signal producing step comprises the steps of:

issuing firing commands to said thyristors in said first thyristor bridge; and producing a signal representative of the logical OR combination of said firing commands.

25. The method of claim 23 wherein said second signal producing step comprises the steps of:
   detecting conduction in said thyristors in said first thyristor bridge;
   producing CONDUCTING signals in response to detecting said thyristors conducting; and
   producing said second signal representative of a logical combination of said CONDUCTING signals indicative of conduction in said first thyristor bridge.

26. The method of claim 25 wherein said conduction detecting step comprises the steps of:
   determining a forward bias voltage across said thyristors in said first thyristor bridge; and
   comparing said determined forward bias voltage with a predetermined reference voltage.

27. The method of claim 26 wherein said CONDUCTING signal producing step comprises the step of producing said CONDUCTING signal in response to said determined forward bias voltage is below said predetermined reference voltage.

* * * * *